US008606657B2

(12) United States Patent
Chesnut et al.

(10) Patent No.: US 8,606,657 B2
(45) Date of Patent: Dec. 10, 2013

(54) AUGMENTED REALITY METHOD AND SYSTEM FOR DESIGNING ENVIRONMENTS AND BUYING/SELLING GOODS

(75) Inventors: Casey Chesnut, Garland, TX (US); Scott Rudolph, Waukesha (WF)

(73) Assignee: Edgenet, Inc., Atlanta, GA (US)

( * ) Notice: Subject to any disclaimer, the term of this patent is extended or adjusted under 35 U.S.C. 154(b) by 218 days.

(21) Appl. No.: 12/691,523

(22) Filed: Jan. 21, 2010

(65) Prior Publication Data

US 2010/0185529 A1 Jul. 22, 2010

Related U.S. Application Data

(60) Provisional application No. 61/146,116, filed on Jan. 21, 2009.

(51) Int. Cl.
*G06Q 30/00* (2012.01)
(52) U.S. Cl.
USPC ........................................ 705/27.2; 705/26.61
(58) Field of Classification Search
USPC ...................................................... 705/26, 27
See application file for complete search history.

(56) References Cited

U.S. PATENT DOCUMENTS

| | | | |
|---|---|---|---|
| 6,381,583 B1* | 4/2002 | Kenney | 705/26.8 |
| 6,765,569 B2 | 7/2004 | Neumann et al. | |
| 7,204,428 B2 | 4/2007 | Wilson | |
| 7,274,380 B2 | 9/2007 | Navab et al. | |
| 7,277,572 B2 | 10/2007 | MacInnes et al. | |
| 2002/0093538 A1* | 7/2002 | Carlin | 345/778 |
| 2003/0174178 A1* | 9/2003 | Hodges | 345/848 |
| 2007/0038944 A1 | 2/2007 | Carignano et al. | |
| 2007/0202472 A1 | 8/2007 | Moritz | |

OTHER PUBLICATIONS

"If you build it will they come? An empirical investigation of consumer perceptions and strategy in virtual worlds" Goel, Lakshmi; Prokopec, Sonja. Electronic Commerce Research 9.1-2 (Jun. 2009) 115-134. Retrieved from Proquest Jul. 26, 2013.*

* cited by examiner

*Primary Examiner* — Courtney Stopp
(74) *Attorney, Agent, or Firm* — Joseph T. Leone, Esq; Daniel A. Blasiole; DeWitt Ross & Stevens, S.C.

(57) ABSTRACT

Described is a method and a corresponding system for designing interior and exterior environments and for selling real world goods that appear as virtual objects within an augmented reality-generated design. The method includes the steps of generating a digitized still or moving image of a real world environment; providing in a programmable computer a database of virtual objects; parsing the image with a programmable computer to determine if the image contains any real world markers corresponding to the virtual objects in the database; retrieving corresponding virtual objects from the database and superimposing the images contained in the virtual objects in registration upon their corresponding real world markers in the image; and enabling users to retrieve the attributes of the real world objects depicted in the augmented reality image.

19 Claims, 3 Drawing Sheets

AUGMENTED REALITY METHOD AND SYSTEM FOR DESIGNING ENVIRONMENTS AND BUYING/SELLING GOODS

CROSS-REFERENCE TO RELATED APPLICATIONS

Priority is hereby claimed to provisional application Ser. No. 61/146,116, filed Jan. 21, 2009, and incorporated herein by reference.

FIELD OF THE INVENTION

The invention is directed to an augmented reality system and a corresponding method for designing interior and exterior environments, and for selling real world goods that appear as virtual objects within the augmented reality-generated design.

BACKGROUND

Augmented Reality (AR) is a technology that enhances a person's view of the real world with virtual, computer-generated objects such as stationary and/or moving images, text, data, etc., which are projected through a video monitor. Unlike virtual reality (VR), wherein the system places the user in a totally synthetic computer-generated environment, an AR system merges computer-synthesized objects with a user's real world environment, to yield a dynamic environment that is part real and part virtual. Thus, in AR systems, the computer-generated graphics interact with, supplement, and augment the user's interactions and perceptions of a real-world environment.

It is critical to draw a clear distinction between AR environments and VR environments. In a VR environment, the user interacts with (or is "immersed into") a three-dimensional environment which is entirely computer-generated. Thus, VR systems are described as being virtual, interactive, and immersive. In sophisticated, computationally demanding versions, the VR environment can be a photorealistic, three-dimensional space. But, everything within the VR environment is not real; every object, surface and image is computer generated. Thus, when immersed in a VR environment, the user is incapable of sensing his real world environment.

In contrast, AR systems supplement the real world with virtual, computer-generated objects that appear to co-exist in the same space as the real world. Thus, when immersed in an AR environment, the user is fully aware of his real world environment because the AR-generated objects are layered on top of the user's real world environment. In effect, AR systems link and combine virtual environments with actual environments in a dynamic, interactive, and real time fashion. The AR software generates the virtual objects and their attributes, and juxtaposes images of the virtual objects with images of real objects taken from a real environment. The virtual objects are disposed in registration with specifically defined real world markers.

This last item, registration, is a notable parameter that must be addressed in AR systems, but is wholly absent in VR systems. Because VR systems are entirely computer generated, they are intrinsically self-orienting; the placement of every virtual object in a VR environment can be defined in computer code with respect to another virtual object. In contrast, an AR system must place the virtual objects in proper registration both to other virtual objects generated by the system and to real world objects. Registration of the virtual objects and the real objects in an AR environment is the subject of much on-going research.

A typical augmented reality system includes a display device and a tracking device with associated software housed in a computer. The computer can be of any description—desktop, laptop, hand-held, mobile, or wearable computer. The display device and tracking device may be operationally connected to the computer by any means, such as via a hard-wire connection directly to the computer or to computer network or via wireless connections. The software monitors events detected by the tracking device to determine the present position of the display in the real world and to retrieve virtual objects for use by the user. In order for the display device to present the correct virtual objects, the virtual objects and the real world must be in registration or otherwise synchronized in some fashion. In short, in order for the AR environment to be useful, virtual objects must appear at proper places in the real world so that the user can correctly determine spatial relationships and orientations. For the AR environment to function optimally, registration of the computer-generated graphics must adjust, dynamically and in real time, in response to changes in the user's real world perspective.

Several AR systems are described in the patent literature. A number of these systems specifically address the tracking and registration problem when using mobile AR systems. For example, U.S. Pat. No. 7,274,380, to Naveb et al. (issued Sep. 25, 2007) describes an augmented reality system having a very specific means for determining registration and orientation of the virtual objects with respect to the real objects in the AR environment. Here, the system comprises a video source that resides at a given location and produces an image. At least one encoded marker resides within the image. This encoded marker is formed to store data within a matrix surrounded by a substantially opaque frame. A marker detector is then coupled to the video source. The marker detector is adapted to derive encoded data from the marker that resides within the image. Within the computer is contained a localization processor that is adapted to receive data from the marker detector and to generate data regarding the location and the orientation of the marker. The localization processor then retrieves information from a database that is related to the location and orientation of the marker. The localization processor then making the information retrieved from the database available to a user by presenting the information on the monitor in which the AR environment is presented. The specific attribute of this registration system is that the frame of each marker is formed so as to have an exterior edge string and an interior edge string. The localization processor calculates the relative lengths of the exterior and interior edge strings to establish the presence of a marker within an image. When the marker is detected, its orientation is determined and the appropriate image is retrieved from the database and superimposed on the marker.

A number of other patents and published patent applications address the problem of how to present the virtual objects and the real objects in the proper orientation to each other. See, for example, U.S. Pat. No. 6,765,569, issued Jul. 20, 2004, to Neumann et al. This patent describes an AR system that uses an auto-calibration feature for rendering annotations into images of a real world scene as the camera moves about relative to the scene. U.S. Patent Application Publication No. US 2007/0 038 944, published Feb. 15, 2007, to Carignano et al., describes an augmented reality system having means for gathering image data of a real environment, means for generating virtual image data from the image data, means for identifying a predefined marker object of the real environment based on the image data, and means for superimposing a set of object image data with the virtual image data at a virtual image position corresponding to the predefined marker object. A similar AR system is described in U.S. Patent Application Publication No. US 2007/0 202 472, published Aug. 30, 2007, to Moritz.

See also U.S. Pat. No. 7,204,428, issued Apr. 17, 2007, to Wilson. This object identification system operates using infrared video. In this approach, a coded pattern applied to an object is identified when the object is placed on a display surface of an interactive display. The coded pattern is detected in an image of the display surface produced in response to reflected infrared (IR) light received from the coded pattern by an IR video camera disposed on an opposite side of the display surface from the object. The coded pattern can be either a circular, linear, matrix, variable bit length matrix, multi-level matrix, black/white (binary), or gray scale pattern.

AR software components are commercially available. ARToolworks, Inc., Seattle, Wash., for example, markets a sofware library called "ARToolKit." The software is made available through a GNU general public license, and through more restrictive licensing terms for commercial applications. ARToolKit is a software library for building AR applications. It is not, itself, an AR application, but rather a tool kit for building AR environments. The ARToolKit software suite addresses one of the key difficulties in developing AR applications: the problem of tracking the user's viewpoint. To know from what viewpoint to draw the virtual imagery, the application needs to know where the user is looking in the real world. The ARToolKit uses physical, distinguishable markers in the real world to calculate the real camera position and orientation relative to physical markers in real time. The software is distributed on-line with the complete source code and allows (in current versions) for single camera position and orientation tracking. The ARToolKit software tracks the virtual objects to the real world markers fast enough to be considered real time.

VR systems for three-dimensional interior design are known and commercially available. See, for example, U.S. Pat. No. 7,277,572, issued Oct. 2, 2007, to MacInnes et al., and the references cited therein. This patent describes a method for generating and rendering a photorealistic, three-dimensional perspective view of a three-dimensional object selectively positioned within a three-dimensional scene. Commercially available VR software packages for interior design include "Custom Home 3-D Design & Decor" (Sierra, Inc.), "5-in-1 Home Design" (Punch! Software LLC), and "3D Home Interiors" (Broderbund).

SUMMARY OF THE INVENTION

The invention is thus directed to a method and a corresponding system for designing interior and exterior environments and for selling real world goods that appear as virtual objects within an augmented reality-generated design. The method comprises generating a digitized still or moving image of a real world environment. Provided in a programmable computer is a database of virtual objects wherein each virtual object has at least one corresponding real world marker. Each virtual object describes and/or depicts a real world object for sale. Each virtual object encodes an image of its corresponding real world object, as well as attributes of the corresponding real world object (e.g., make, model, size, cost, compatibility, etc.) The digital image is parsed with a programmable computer to determine if the image contains any real world markers corresponding to the virtual objects in the database. Any corresponding virtual objects are then retrieved from the database. The images encoded by the virtual objects are superimposed in registration upon their corresponding real world markers in the image, thereby generating an augmented reality image. Users are then enabled to retrieve the attributes of the real world objects depicted in the augmented reality image. This can be done, for example, by programming the computer to display the attributes of the real world item when a computer cursor is scrolled over each virtual object in the augmented reality image.

The invention also includes a corresponding system for designing interior and exterior environments and for selling real world goods that appear as virtual objects within an augmented reality-generated design. The system comprises a digital imaging device configured to generate a digitized still or moving image of a real world environment. The imaging device is operationally connected to a programmable computer having stored therein a database of virtual objects wherein each virtual object corresponds to at least one real world marker. Each virtual object depicts a real world object for sale, and each virtual object encodes an image of its corresponding real world object and attributes of the corresponding real world object. A comparator program is stored in the programmable computer. The comparator is configured to parse images generated by the imaging device to determine if the images contain any real world markers corresponding to the virtual objects in the database. A retrieval program is provided and configured to retrieve corresponding virtual objects from the database. A merging unit superimposes the images contained in the virtual objects in registration upon their corresponding real world markers in the image generated by the imaging device, thereby generating an augmented reality image. A display device is provided and configured to enable users to retrieve the attributes of the real world objects depicted in the augmented reality image.

In the method and the system, the digital imaging device may be selected from the group consisting of a digital still camera, a digital movie camera, a digital scanner, and the like. The attributes of the corresponding real world objects encoded by each virtual object may selected from the group consisting of cost to purchase, cost to ship, physical dimensions, sizing, color, texture, weight, availability, power requirements, electronic compatibility with other real world objects, country of manufacture, combinations thereof, and the like. The real world markers may be selected from the group consisting of circular, linear, matrix, variable bit length matrix, multi-level matrix, black/white (binary), gray scale patterns, two- or three-dimensional codes, two- or three-dimensional renderings of real world, three-dimensional objects, and combinations thereof. All of the foregoing lists are exemplary and non-limiting.

DETAILED DESCRIPTION OF THE INVENTION

Figure 1:
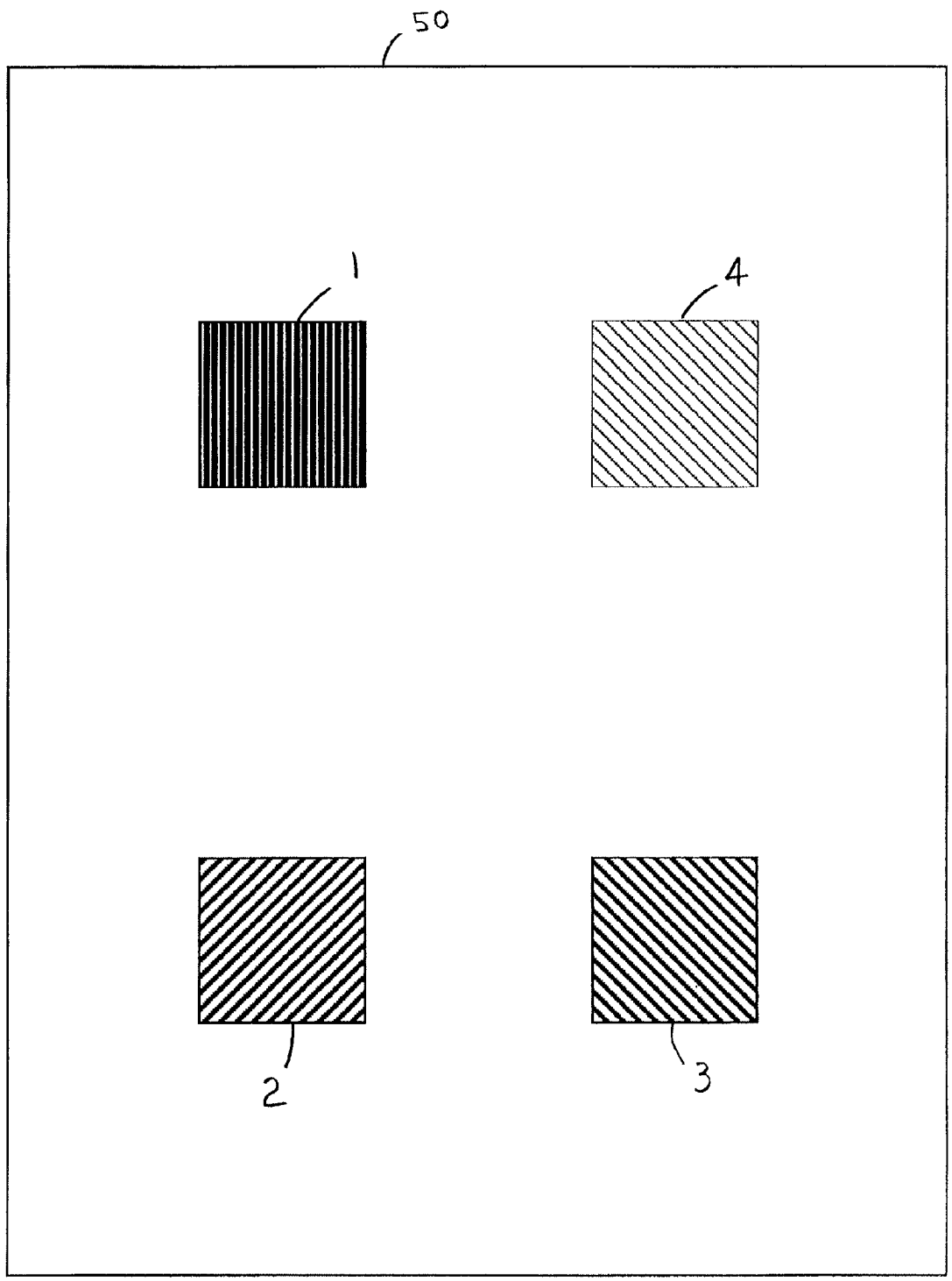
FIG. 1 depicts a series of exemplary real world markers that can be used in the present invention.

The invention is an AR system and a corresponding method for designing interior and exterior environments, and for selling real world goods that appear as virtual objects within the augmented reality-generated design.

The system comprises a number of components for generating the AR environment. The first component is a camera or other video input to generate a digitized video image of the real world. For brevity, this component will simply be referred to as a camera. The camera may be any digital device now know or developed in the future that is dimensioned and configured to capture still or motion pictures of the real world and to convert those images to a digital stream of information that can be manipulated by a computer. For example (and by way of an exemplary and non-limiting list), the camera may be a digital still camera, a digital video camera, a web cam, a head-mounted display, a camera phone, a tablet personal computer, an ultra mobile personal computer, and the like. The nature of the camera is not critical to the functionality of the invention so long as the camera renders a digital image or stream of images of the real world.

"Computer" as used herein means any electronic device that is specially and permanently programmed to execute the method described herein (either via software code, hardware-implemented code, firmware-implemented code, or any combination thereof) or any electronic device that can be programmed to execute the method described herein (again via software, hardware, firmware, or any combination thereof), including (by way of example and not limitation), a single (or multiple) processor-based system that may be supported in a stand-alone (desktop, laptop, personal digital assistant), networked, mainframe, or client-server architecture, or other computing environment. The system used to execute the method may including one or more known storage devices (e.g., Random Access Memory (RAM), Read Only Memory (ROM), hard disk drive (HDD), floppy drive, tape drive, compact disk/write-read-ROM, DVD, bubble memory, etc.), and may also include one or more memory devices embedded within a processor, or shared with one or more of the other components. The computer programs or algorithms described herein may easily be configured as one or more hardware modules, and (vice-versa) any hardware modules shown may easily be configured as one or more software modules without departing from the invention.

The next component of the system is a series of unique real world markers. The markers can be of any design, now known or developed in the future, including a circular, linear, matrix, variable bit length matrix, multi-level matrix, black/white (binary), gray scale patterns, and combinations thereof. The markers can be two-dimensional or three-dimensional. The markers can be two- or three-dimensional barcodes, or two- or three-dimensional renderings of real world, three-dimensional objects. For example, the markers may be thumbnail images of the virtual images that will be matched to the markers. The marker may also be an image of a real world item which the software has been programmed to recognize. So, for example, the software can be programmed to recognize a refrigerator or other appliance from a video stream of a kitchen. The software then superimposes a virtual object in place of the real world refrigerator. Each unique real world marker (as described more fully below) corresponds to a virtual object, or a quality of a virtual object (e.g. the object's color, texture, opacity, etc.) or both the virtual object itself and all (or a subset) of the qualities of the virtual object.

The system further includes an AR library (i.e. a database of virtual objects), a computer that can selectively search and access the library, and a video monitor dimensioned and configured to display the real world digital image captured by the camera, as well as virtual objects retrieved from the AR library. On the computer is stored a search and return engine that links each unique real world marker to a corresponding virtual object in the AR library.

In operation, the camera returns a digital video stream of the real world, including images of one or more of the markers described previously. Image samples are taken from the video stream and passed to the computer for processing. The search and return engine then searches the AR library for the virtual objects that correspond to the marker images contained in the digital video stream of the real world. Once a match is made between a real world marker contained in the digital video stream and the AR library, the AR library will return the virtual object, its qualities, and its orientation to the video monitor. The virtual object is then superimposed upon the real world image. The virtual object is placed into the real world image registration with its corresponding marker. Multiple markers may be used to position and orient a single virtual object. For example, four unique markers could be used to construct the virtual walls of a virtual room.

In other words, the search and return engine parses the real world image to determine if it contains a marker. If the real world image does contain a marker, the AR library is queried to return the virtual object that corresponds to the real world marker. The virtual object is returned to a video merging unit (that may be a separate unit or an integral part of the computer) that merges the real word image with the virtual image retrieved from the AR library. The virtual object may be two-dimensional or three-dimensional, preferably three-dimensional. At a minimum, the AR library returns the virtual object, as well as its position and orientation within the real world image (which is dictated by the position and orientation of the corresponding marker in the real world image). The AR library may also return information pertaining to the nature, cost, dimensions, or any other quality about the item depicted in the virtual object. The virtual object is then rendered on top of its corresponding real world marker according to the marker's position and orientation so that the virtual object appears in place of (or superimposed upon) the real world marker.

In the preferred version of the invention, the virtual objects represent real world products such as furniture (chairs, couches, tables, etc.), kitchen appliances (stoves, refrigerators, dishwashers, etc.), office appliances (copy machines, fax machines, computers), consumer and business electronic devices (telephones, scanners, etc.), furnishings (pictures, wall hangings, sculpture, knick knacks, plants), fixtures (chandeliers and the like), cabinetry, shelving, floor coverings (tile, wood, carpets, rugs), wall coverings, paint colors, surface textures, countertops (laminate, granite, synthetic countertops), electrical and telecommunication jacks, audio-visual equipment, speakers, hardware (hinges, locks, door pulls, door knobs, etc.), exterior siding, decking, windows, shutters, shingles, banisters, newels, hand rails, stair steps, landscaping plants (trees, shrubs, etc.), and the like, and qualities of all of these (e.g. color, texture, finish, etc.). The real world view is a preferably a picture of a consumer's home or work environment (interior or exterior) that he wishes to design to his liking. The AR system is then used to render an AR environment comprising the user's chosen real world location, augmented by virtual objects selected by the user and representing real world durable and/or consumable goods that are available for purchase by the user.

The system is better understood with reference to the attached drawings, where the same reference numerals are used throughout the figures to represent the same elements.

FIG. 1 is a schematic rendering of a real world environment 50 having placed therein four real world, unique markers, 1, 2, 3, and 4. The patterns on the four markers are for illustration only and are non-limiting. As noted above, the patterns used on the markers to render the markers unique can be any pattern or code now known or developed in the future. For purposes of illustration, the four markers depicted in FIG. 1 are all different from one another. The same marker, however, may appear an unlimited number of times in any real world environment 50. Each unique marker, however, is generally assigned its own corresponding unique virtual object. This, however, is preferred, and not mandatory. The concordance between the real world markers and their corresponding virtual objects may be linked in any logical fashion dictated by the needs of the user (e.g, in classes or sub-classes according to size, function, color, etc.). Thus, for example, one marker may represent a unique make of refrigerator in a specified color, while another marker may represent the same make of refrigerator, but in a different color. Or a marker may represent that same make of refrigerator in any color, with a second marker being used to provide the color of the refrigerator designated by the first marker. For purposes of brevity, it will be assumed that the four markers 1, 2, 3, and 4, are linked to four different virtual objects, and that those four virtual objects are three-dimensional renderings of real world goods, such as, for example, a refrigerator, a stove, a dishwasher, and a television.

Figure 3:
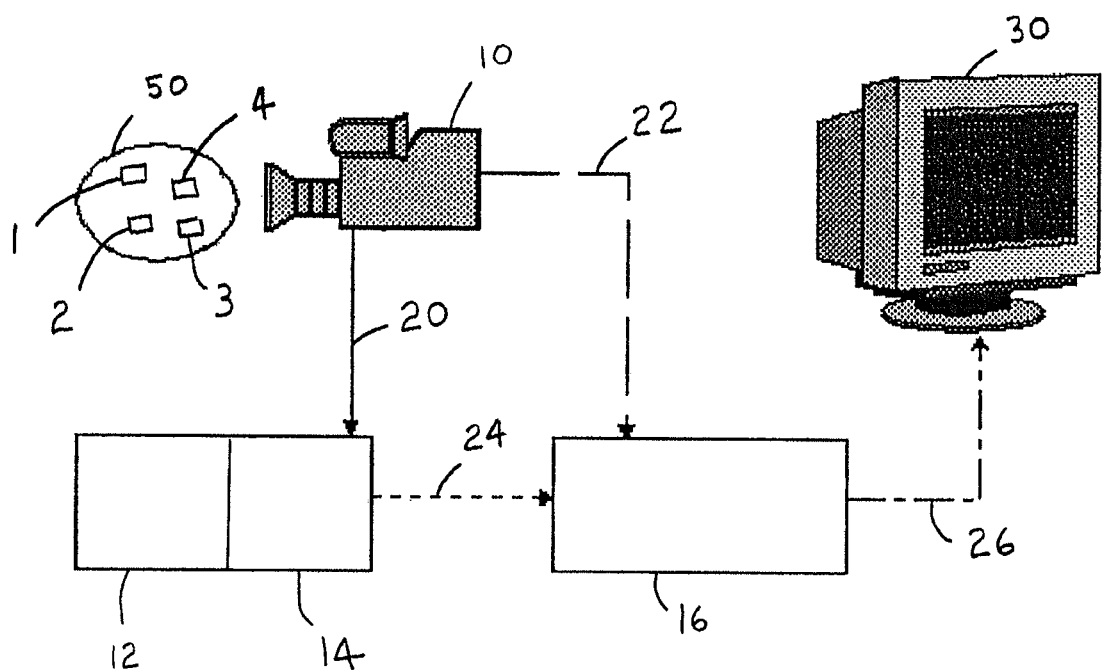
FIG. 3 is a schematic rendering of an AR system according to the present invention.

The system itself is depicted schematically in FIG. 3. In FIG. 3, a camera 10 is operationally connected to a computer 14, on which is stored the AR library 12. The link between the camera 10 and the computer 14 is established by connector 20. The connector can be any type of connector now known or developed in the future for transmitting the digital images from the camera 10 to the computer 14, including both hard-wire connectors and wireless connectors. The same too applies to connectors 22, 24, and 26, which shall be discussed in turn.

The camera 10 is likewise operationally connected, via connector 22, to a video merging module 16, which for purposes of illustration only is shown as a separate unit in FIG. 3. In most instances, the video merging module 16 is integrated into the computer 14. The output from the video merging module 16 is transmitted to monitor 30, which is operationally connected to the video merging module 16 by connector 26.

Still referring to FIG. 3, the camera 10 takes a still or moving image of real world environment 50 that includes markers 1, 2, 3, and 4. This image is exported by the camera to both the computer 14, and the video merging module 16. The search and return engine within the computer 14 then scans the digital video bit stream arriving via connector 20 to determine if the real world image contains any markers. Because markers 1, 2, 3, and 4 are present in the real world image, the computer 14 retrieves the corresponding virtual objects from AR library 12. The retrieved virtual objects are then exported to the video merging module, where they are oriented and placed in registration in place of or superimposed upon the markers present in the real world image sent to the video merging module 16 via connector 22. The resulting superimposed image, now an AR image, is exported via connector 26 to monitor 30 for viewing.

Figure 2:
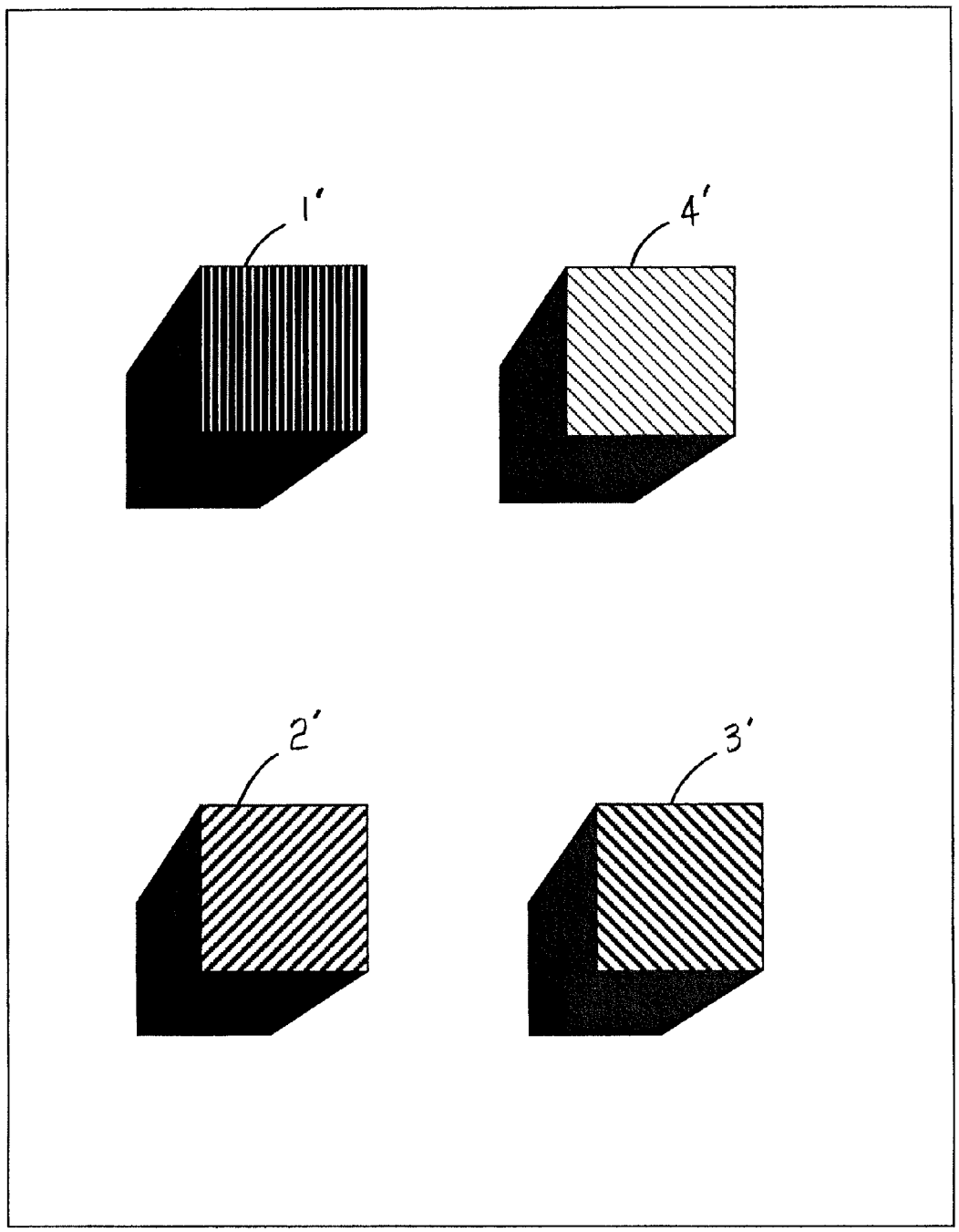
FIG. 2 depicts an AR view of the real world markers as shown in FIG. 1 having virtual objects superimposed thereon to yield an AR environment.

The image generated could appear, for example, as shown in FIG. 2. In FIG. 2, the real world is depicted by rectangle 50, while the augmented, virtual objects are depicted as three-dimensional cubes 1', 2', 3', and 4'. Note that the virtual cubes 1', 2', 3', and 4' are generated in registration with the real world markers 1, 2, 3, and 4 as depicted in FIG. 1.

FIG. 2 is for purposes of illustration only. The virtual objects 1', 2', 3', and 4' could be images of any real world object, as listed earlier.

The method of the invention comprising using the AR system to design AR environments and then to sell the real world goods represented by the virtual objects presented in the AR environment. Thus, a typical implementation of the invention might proceed as follows:

A home improvement store, or "do-it-yourself"-type store would have set aside a kiosk or other area having a system as depicted in FIG. 3 set up for customers' use. A customer would then bring to the store a digital image of, say, his kitchen. This digital image would be the real world image 50 as shown in FIG. 3. The real world image would then be placed in view of the camera 10. Markers are then placed on the image 50 to represent new features that could be incorporated into the buyer's kitchen. Thus, in place of the existing refrigerator, stove, and dishwasher, markers would be placed. The markers are linked to virtual objects which are three-dimensional pictures of new appliances that the seller either has in stock for immediate delivery or which can be special ordered. In this fashion, the consumer can experiment with a host of markers representing any aspect of his kitchen design: from major appliances, to new cabinets, to new countertops, to counter-top appliances such as coffee makers, stand mixers, microwave ovens, blenders, bread makers, etc.

Because the AR virtual objects are placed in registration with the markers in the real world view, and in the proper orientation, the real world inter-relationships of the user's real world environment and the real goods represented by the virtual objects can be assessed. For example, seemingly simple questions can be answered while the user is in the store. For example, "Will this specific coffee maker fit underneath the existing kitchen cabinets?" If the buyer did not take the height measurement between his existing countertop and the bottom edge of the existing cabinet, the question cannot be answered without either returning home to take the measurement, or buying the coffee maker and hoping it fits. (And coming back to the store to exchange it for another coffee maker if the first one does not fit.)

Equally important, the system will not only return virtual images of real world objects, the virtual objects may also have embedded within them a wealth of information about each real world object. Again, taking the example of a kitchen, the user may place objects representing the three major kitchen appliances: refrigerator, oven/stove/range, and dishwasher. The virtual object representing each of these appliances may also have embedded within it the actual physical dimensions of each appliance, the available colors, the configurations available (e.g., gas or electric oven; left or right opening fridge door; freezer on top, freezer on bottom, or side-by-side configuration), the electricity requirements of the appliances, etc.

The AR system thus allows the buyer to experiment using a real world image of the actual environment he wishes to design or otherwise change. This is a huge boon to the buyer. Rather than trusting to fate that the oven or sink will actually look pleasing once installed, he can see what it will actually look like installed, without even leaving the store. For the seller, it allows them to tailor their inventory on the fly to changing consumer tastes. Perhaps more importantly, it acts as a tool to limit returns to the store caused by ill-fitting appliances and fixtures, or due simply to consumer dissatisfaction with the item once the user took it out of the box when they got home. Too many items have been returned to too many stores because the buyer felt that the item was not what he expected at the time the purchase was made. Using the AR system of the present invention, the buyer can see exactly what the item will look like, in its intended environment, before the purchase is even consummated. If the buyer is happy after viewing the object in the present AR system, and the purchase is consummated, the purchase is far more likely to stay consummated.

As the old adage goes, potential buyers like to buy, but they hate to be sold. The present system allows buyers to explore their options carefully, in real time and in real space, but using virtual objects. Thus, buyers are given a measure of comfort and certainty that their major (and minor) purchases are, in fact, the right purchases in view of the available alternatives. They themselves, using the present system, are enabled to view the alternatives and evaluate them in an AR space.

The preferred software for generating the AR virtual objects and matching them to the real world markers is the ARToolKit, mentioned previously. This body of AR tools provides a straightforward framework for creating real-time AR applications. The modules will function across a wide variety of operating systems, including Windows, Linux, Mac OS X, and SGI. The tools overlay the three-dimensional virtual objects on the real world markers based on a computer vision algorithm that accounts for both the position and orientation of the marker. The software will support multiple camera tracking, so that AR images can be generated from more than one camera at more than one point of view.

Other commercially available AR tool software packages may also be used to generate the virtual objects and to link them to real world markers. Suitable programs include, for example, osgART (HIT Lab NZ, Christchurch, New Zealand).

What is claimed is:

1. A method for designing interior and exterior environments and for selling real world goods that appear as virtual objects within an augmented reality-generated design, the method comprising:
   (a) generating a digitized still or moving image of a consumer's real world environment containing a real world marker;
   (b) providing in a programmable computer a database of virtual objects representing real world objects for sale by a seller, wherein each virtual object has at least one corresponding real world marker, each virtual object encodes an image of a corresponding real world object, and each virtual object further encodes attributes of the corresponding real world object; then
   (c) parsing the image of step (a) with a programmable computer to determine that the image contains the real world marker; and then
   (d) retrieving from the database a corresponding virtual object that corresponds to the real world marker in the image of step (a), and superimposing the image encoded by the corresponding virtual object in registration upon the real world marker in the image of step (a) to generate an augmented reality image, wherein the augmented reality image depicts the consumer's real world environment containing the real world object for sale by the seller that corresponds to the corresponding virtual object; and
   (e) enabling retrieval of the attributes of the real world object depicted in the augmented reality image.

2. The method of claim 1, wherein step (a) comprises generating a digitized still image of a real world environment.

3. The method of claim 2, wherein in step (b) each virtual object encodes a two-dimensional image of its corresponding real world object.

4. The method of claim 2, wherein in step (b) each virtual object encodes a three-dimensional image of its corresponding real world object.

5. The method of claim 2, wherein in step (b) each virtual object encodes attributes of the corresponding real world object selected from the group consisting of manufacturer, model designation, purchase price, physical dimensions, weight, color, texture, country of manufacture, availability in inventory, shipping cost to user's location, product-specific requirements, compatibility with other real world objects, user manual, and combinations thereof.

6. The method of claim 2, wherein step (e) comprises enabling users to retrieve the attributes of the real world objects on a networked computer, a personal digital assistant, a cell phone, or an Internet-enabled wireless device.

7. The method of claim 2, wherein step (c) comprises parsing the image of step (a) for real world markers selected from the group consisting of circular, linear, matrix, variable bit length matrix, multi-level matrix, black/white (binary), or gray scale patterns, two- or three-dimensional barcodes, two- or three-dimensional renderings of real world objects, color, texture, opacity, and combinations thereof.

8. The method of claim 1, wherein step (a) comprises generating a digitized moving image of a real world environment.

9. The method of claim 8, wherein in step (b) each virtual object encodes a two-dimensional image of its corresponding real world object.

10. The method of claim 8, wherein in step (b) each virtual object encodes a three-dimensional image of its corresponding real world object.

11. The method of claim 8, wherein in step (b) each virtual object encodes attributes of the corresponding real world object selected from the group consisting of manufacturer, model designation, purchase price, physical dimensions, weight, color, country of manufacture, availability in inventory, shipping cost to user's location, product-specific requirements, compatibility with other real world objects, user manual, and combinations thereof.

12. The method of claim 8, wherein step (e) comprises enabling users to retrieve the attributes of the real world objects on a networked computer, a personal digital assistant, a cell phone, or an Internet-enabled wireless device.

13. The method of claim 8, wherein step (c) comprises parsing the image of step (a) for real world markers selected from the group consisting of circular, linear, matrix, variable bit length matrix, multi-level matrix, black/white (binary), or gray scale patterns, two- or three-dimensional barcodes, two- or three-dimensional renderings of real world objects, color, texture, opacity, and combinations thereof.

14. A system for designing interior and exterior environments and for selling real world goods that appear as virtual objects within an augmented reality-generated design, the system comprising:
   a digital imaging device configured to generate a digitized still or moving image of a consumer's real world environment containing a real world marker, the imaging device operationally connected to:
   a programmable computer having stored therein a database of virtual objects representing real world objects for sale by a seller, wherein each virtual object corresponds to at least one real world marker, each virtual object encodes an image of a corresponding real world object, and each virtual object further encodes attributes of the corresponding real world object;
   a comparator program stored in the programmable computer and configured to parse the image generated by the imaging device to determine that the image contains the real world marker;

a retrieval program configured to retrieve from the database a corresponding virtual object that corresponds to the real world marker in the image generated by the imaging device, and a merging unit to superimpose the image encoded by the corresponding virtual object in registration upon the real world marker in the image generated by the imaging device, thereby generating an augmented reality image, wherein the augmented reality image depicts the consumer's real world environment containing the real world object for sale by the seller that corresponds to the corresponding virtual object; and a display device configured to enable retrieval of the attributes of the real world object depicted in the augmented reality image.

15. The system of claim 14, wherein the digital imaging device is selected from the group consisting of a digital still camera, a digital movie camera, and a digital scanner.

16. The system claim 14, wherein the real world markers are selected from the group consisting of circular, linear, matrix, variable bit length matrix, multi-level matrix, black/white (binary), or gray scale patterns, two- or three-dimensional barcodes, two- or three-dimensional renderings of real world objects, color, texture, opacity, and combinations thereof.

17. The system claim 14, wherein each virtual object encodes a two-dimensional image of its corresponding real world object.

18. The system claim 14, wherein each virtual object encodes a three-dimensional image of its corresponding real world object.

19. The system claim 14, wherein each virtual object encodes attributes of the corresponding real world object selected from the group consisting of manufacturer, model designation, purchase price, physical dimensions, weight, color, texture, country of manufacture, availability in inventory, shipping cost to user's location, product-specific requirements, compatibility with other real world objects, user manual, and combinations thereof.

* * * * *